Patented Jan. 16, 1951

2,538,724

UNITED STATES PATENT OFFICE 2,538,724

2 - CHLORO - 1 - P - CHLOROPHENYL - 2 - NITRO-1-P-TOLYLPROPANE AND INSECTICIDAL COMPOSITIONS CONTAINING IT

Henry B. Hass, La Fayette, Ind., and Maynard B. Neher, Athens, Ohio, assignors to Purdue Research Foundation, La Fayette, Ind., a corporation of Indiana No Drawing. Application February 19, 1948,
Serial No. 9,633

9 Claims. (Cl. 167—30)

Our invention relates to insecticidal compositions and is particularly concerned with materials adapted for combating flies, the Mexican bean beetle, and other common insect pests. More particularly, it relates to 2-chloro-1-p-chlorophenyl-2-nitro-1-p-tolylpropane as an active ingredient in such compositions, and to methods of producing same.

Many materials and classes of materials have in the past been recommended as insecticides, fungicides, pesticides, and the like. The great majority of these, however, have been impractical for various reasons including availability, cost, impractical physical characteristics such as odor, undesirable effects on the pest host or other object with which the product comes in contact, difficulty and danger of application, and so forth. Of equal, if not greater, importance is the high degree of selectivity possessed by many products of this character. For example, a particular agent may be especially effective against one or two insects but have no harmful action whatsoever on any other when applied to the insects in practical quantities. Also, particular insects are found to be resistant to almost every kind of insecticidal compound of practical utility known. Even closely related chemical compounds often have widely different effects upon both pests and their hosts, with the result that a new material or type of material must be tested under conditions simulating those of actual use before its utility can be determined.

The efficacy of an insecticidal composition against house flies is usually measured in terms of its "knock-down" or per cent "kill." Some insecticides possess both properties in varying degrees and hence the use to be made of a given material should be known in order to permit the selection of the proper material or combination of materials. For example, pyrethrum has the property of producing a high degree of knock-down, but many of the insects immobilized ultimately recover. Other materials, such as dichlorodiphenyltrichloroethane, commonly referred to as D. D. T., have high per cent kill but are relatively low in knock-down and hence, their action is not so quickly seen. For the latter reason it is sometimes found desirable to combine an agent with a high per cent kill with another having high knock-down.

We have now discovered a compound, namely, 2-chloro - 1 - p - chlorophenyl-2-nitro-1-p-tolyl-propane, which possesses the property of high per cent kill for certain types of insects, e. g., the common housefly, and more important still, the Mexican bean beetle for which there has previously been no entirely satisfactory killing agent. As will be shown below, 2-chloro-1-p-chlorophenyl-2-nitro-1-p-tolylpropane is highly effective against this important pest at low concentrations and with substantially no harm to the host, thus making our discovery unusually important from the point of view of practical utility.

The 2 - chloro - 1 - p - chlorophenyl - 2 - nitro-1-p-tolylpropane of our invention may be prepared as follows: Eighty grams of 1-p-chlorophenyl-2-nitro-1-p-tolylpropane was dissolved in a solution of 16 g. of the caustic alkali potassium hydroxide in 220 ml. of methanol and the solution poured into 800 ml. of distilled water. The mixture, containing the potassium salt of 1-p-chlorophenyl - 2 - nitro - 1 - p - tolylpropane, was cooled to 15° C. and chlorine was introduced, keeping the solution thoroughly agitated and cooled to below 20° C., until it became acidic. The product thus obtained was dissolved in ether, washed with sodium bicarbonate solution, then distilled water, and finally dried with anhydrous sodium sulfate and the ether removed by evaporation. The residue was next distilled, boiling at 168–70° C. at 0.2 mm., giving a yield of 70 g. of 2 - chloro - 1 - p-chlorophenyl - 2 - nitro - 1 - p - tolylpropane in the form of a very viscous oil, representing a yield of 78%. When dissolved in ethanol and chilled in a dry-ice-bath a solid separated, and after again recrystallizing from ethanol 20 g. of a fine, white powder was obtained, which melted at 74–75° C.

The 1 - p - chlorophenyl - 2 - nitro - 1 - p - tolylpropane used in the above condensation operation was obtained by condensing 1-p-chlorophenyl-2-nitro-1-propanol with toluene, using 85% sulfuric acid as the condensation agent. The operation is most readily carried out by preparing a mixture of sulfuric acid monohydrate and toluene and after cooling the resulting mixture to a temperature below 10° C., adding the 1-p-chlorophenyl-2-nitro-1-propanol thereto at such a rate that the temperature remains below approximately 10° C. This operation is described in more detail in our companion Case U. S. Serial No. 9,632 filed February 19, 1948.

The 1-p-chlorophenyl-2-nitro-1-propanol used in preparing the 1-p-chlorophenyl-2-nitro-1-phenylpropane was obtained by condensing p-chlorobenzaldehyde with nitroethane. A convenient method of effecting this condensation is by allowing a solution of sodium methylate obtained from 3.5 parts of sodium and 70 parts by volume of methyl alcohol to react with a solution cooled to below 0° C. of 21 parts of p-chlorobenzaldehyde and of 10 parts of nitroethane in 120 parts by volume of ethyl alcohol, the sodium salt of 1-p-chlorophenyl-2-nitro-1-propanol being thereby produced. The salt is recovered by filtration, washed with ether and dried for a short time in air. The resulting salt is next dissolved in cold water, and treated with a sufficient quantity of dilute acetic acid to make the solution slightly acid. The oil that then separates is extracted with ether. After removal of the latter, the resulting 1-p-chlorophenyl-2-nitro-1-propanol may be further purified by distillation if desired.

The exact quantity of 2-chloro-1-p-chlorophenyl-2-nitro-1-p-tolylpropane utilized in insecticidal compositions will be found to vary rather widely and to a certain extent depends upon the particular type of composition in which the material is being employed, the method of application, the nature of the insect pest to be controlled, and other factors commonly encountered in the insecticidal art. Since the material is relatively insoluble in some of the common solvents, this factor must also naturally be taken into consideration. Generally speaking, however, concentrations ranging from about 0.5 to 2.0%, based upon the total weight of the finished insecticidal composition, give satisfactory results in liquid spray compositions. When incorporated in a solid carrier such as "Pyrax," a ground pyrophyllite or ground aluminum silicate, concentrations ranging from about 0.15 to 5.0 and even higher percentages may be employed.

As liquid vehicles or carriers we may employ "Ultrasene," or other like pure petroleum distillates or even commercial kerosene where odor is not too important a factor, or coal tar hydrocarbons such as xylene or toluene. At 0.5% concentration 2-chloro-1-p-chlorophenyl-2-nitro-1-p-tolylpropane is completely soluble in "Ultrasene" but a 1.0% concentration appears to be about the limit of its solubility in this particular solvent. However, by substituting 10% of n-butyl phthalate a concentration of 1.0%, or better, can be readily obtained and by substituting 10% of butyl carbitol for an equivalent amount of "Ultrasene" the concentration of 2-chloro-1-p-chlorophenyl-2-nitro-1-p-tolylpropane can be increased to 2.0%. Other combinations may also be satisfactorily employed. As a solid vehicle we may employ any of the various forms of ground aluminium silicate commonly employed in the insecticidal compositions, such as bentonite, fuller's earth, kieselguhr, kaolin, talc, and the like.

The effectiveness of 2-chloro-1-p-chlorophenyl-2-nitro-1-p-tolylpropane as a toxic agent against female houseflies was determined as follows. Adult flies reared in the laboratory under constant conditions were introduced into replicated spherical cages. Each cage was then placed on a revolving turntable and the flies subjected to an atomized spray delivered under constant pressure at the rate of 1.0 ml. per cage. Immediately after the flies in a cage were sprayed they were transferred to an observation cage in which they were maintained under constant conditions for twenty-four hours. At the end of that time the number of dead flies was counted. Under such conditions 1.0 ml. of a 1.0% concentration of our 2-chloro-1-p-chlorophenyl-2-nitro-1-p-tolylpropane gave 33.4% kill in 24 hours.

The effectiveness of 2-chloro-1-p-chlorophenyl-2-nitro-1-p-tolylpropane against other pests and when applied with solid inert carriers of the types referred to above is shown below. Different quantities of the active insecticidal agent were uniformly mixed with the solid inert carrier and the dust thus obtained applied in uniform amounts to cranberry beans to which Mexican bean beetle larvae were then transferred. At the end of 72 hours the percentage of dead larvae was determined. The results of such tests are shown in the following table.

TABLE

| Percent 2-Chloro-1-p-chlorophenyl-2-nitro-1-p-tolylpropane. | Percent Dead in 72 hours | Percent Feeding |
|---|---|---|
| 5% in "Pyrax" | 100 | less than 5 |
| 2.5% in "Pyrax" | 100 | 10 |
| 1.25% in "Pyrax" | 87 | 5 |
| 0.625% in "Pyrax" | 74 | 10 |

Application of this compound at 5.0% concentration in "Pyrax" gave a kill of 13% in the case of the larger milkweed bug.

2-chloro-1-p-chlorophenyl-2-nitro-1-p-tolylpropane is also effective as a moothproofing agent. A 1% solution in acetone was applied to strips of mohair woolen cloth which were then dried and subjected to attack by black carpet beetle larvae. In the standard test period of three weeks there was no feeding by the larvae, thus indicating complete mothproofing. The cloth remained normal in appearance.

In view of the data shown above, it can be seen that 2-chloro-1-p-chlorophenyl-2-nitro-1-p-tolylpropane possesses marked insecticidal activity. It may also be utilized in conjunction with materials such as pyrethrum, rotenone, derris extract, nicotine, organic thiocyanates, and the like.

The insecticidal composition of our invention may be applied in a number of different ways. For example, it may be dissolved in kerosene or similar petroleum distillates with or without the addition of other toxicants and sprays. For use on plants, it may be dissolved in various plant spraying oils and emulsified in water to produce sprayable emulsions. Any of the common emulsifying agents utilized for such purposes can be employed in conjunction with these insecticidal compositions. For numerous uses, however, it is more desirable to employ the active insecticidal agent in admixture with or absorbed on a solid carrier such as those hereinabove disclosed.

Now having described our invention, what we claim is:

1. 2-chloro-1-p-chlorophenyl-2-nitro-1-p-tolylpropane.

2. An insecticidal composition comprising from 0.15 per cent to five per cent by weight of 2-chloro-1-p-chlorophenyl-2-nitro-1-p-tolylpropane and an inert carrier therefor.

3. An insecticidal composition comprising a mixture of 2-chloro-1-p-chlorophenyl-2-nitro-1-p-tolylpropane and a petroleum distillate as a carrier.

4. The composition of claim 3 wherein the 2-chloro-1-p-chlorophenyl-2-nitro-1-p-tolylpropane is present in the proportion of from about 0.15 to 5 per cent by weight.

5. An insecticidal composition comprising a mixture of 2-chloro-1-p-chlorophenyl-2-nitro-1-p-tolylpropane and ground aluminum silicate as a carrier.

6. The composition of claim 5 wherein the 2-chloro-1-p-chlorophenyl-2-nitro-1-p-tolylpropane is present in the proportions of from about 0.15 to 5 per cent by weight.

7. An insecticidal composition comprising a mixture of 2-chloro-1-p-chlorophenyl-2-nitro-1-p-tolylpropane and a coal tar hydrocarbon as a carrier.

8. The composition of claim 7 wherein the 2-chloro-1-p-chlorophenyl-2-nitro-1-p-tolylpropane is present in the proportions of from about 0.15 to 5 per cent by weight.

9. The process which comprises dissolving 1-p-chlorophenyl-2-nitro-1-p-tolylpropane in a solution of caustic alkali to form the corresponding salt and chlorinating the resulting solution at a temperature of the order of from about 15° to 20° C. to form 2-chloro-1-p-chlorophenyl-2-nitro-1-p-tolylpropane.

HENRY B. HASS.
MAYNARD B. NEHER.

REFERENCES CITED

The following references are of record in the file of this patent:

UNITED STATES PATENTS

| Number | Name | Date |
| --- | --- | --- |
| 2,337,912 | McBee et al. | Dec. 28, 1943 |
| 2,397,802 | Muller | Apr. 2, 1946 |